Oct. 20, 1925.
G. H. DALMAN
1,558,242
SWITCH MECHANISM FOR ROAD SIGNALS
Filed June 15, 1922
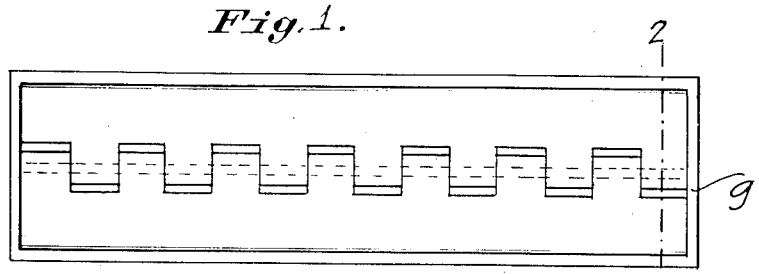
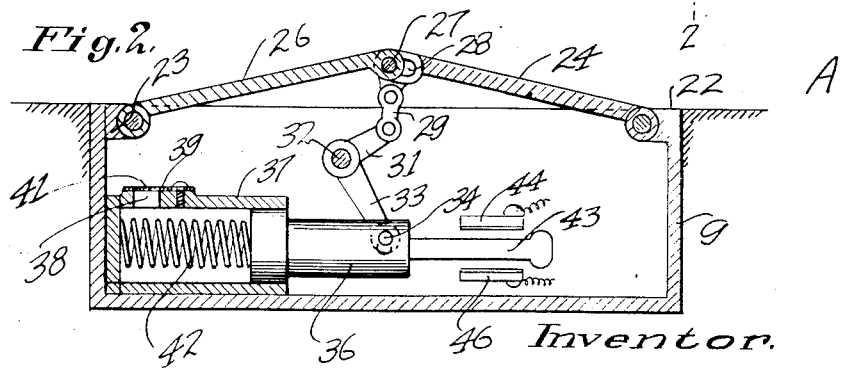
Inventor.
G. H. DALMAN
Victor J. Evans Patented Oct. 20, 1925.

1,558,242

UNITED STATES PATENT OFFICE.

GERRIT H. DALMAN, OF RIPON, CALIFORNIA.

SWITCH MECHANISM FOR ROAD SIGNALS.

Application filed June 15, 1922. Serial No. 568,608.

*To all whom it may concern:*

Be it known that I, GERRIT H. DALMAN, a citizen of the United States, residing at Ripon, in the county of San Joaquin and State of California, have invented new and useful Improvements in Switch Mechanism for Road Signals, of which the following is a specification.

This invention relates to improvements in street signaling devices, the principal object of which is to provide a signal which will be operated by a vehicle traveling over the surface of the road to indicate at a crossing the direction in which the vehicle is proceeding.

Another object is to provide a device which will be operated by a vehicle some distance from the street crossing thereby giving pedestrians and other traffic sufficient warning as to the approach of a vehicle.

A further object is to provide an automatic signal of this character which is simple to construct and cheap to install.

Other objects and advantages will be apparent during the course of the following description.

In the accompanying drawings forming a part of this specification, and in which like numerals are employed to designate like parts throughout the same, Figure 1 is a top plan view of the road switch, and Figure 2 is a cross-section taken on the line 2—2 of Figure 1.

As a vehicle approaches the street crossing, it is essential that a warning be given owing to the congested traffic of the present day city. I have therefore devised a road switch which extends across one half the width of the street so that a car proceeding toward the crossing will contact the road switch, which contact will, through electrical means, flash a lamp or similar signal thereby warning a vehicle coming in the opposite direction of the approach of the vehicle, which vehicle may possibly be out of sight owing to the presence of building and the like.

Referring to Figure 2, the construction of one of the road switches is illustrated, wherein the numeral 9 designates a box preferably made of metal, which box is provided with ears 22 and 23. These ears extend along opposite sides of the box and form a means for hinging a cover formed of two parts as shown at 24 and 26. The part 26 carries a longitudinal pin 27 in its free end and it will be noted, by referring to Figure 1, that these covers 24 and 26 are dovetailed. The cover 24 is provided with eyes 28 through which the pin 27 is adapted to pass. Extending downwardly and pivoted to one of the covers as for instance 24, is a link 29, the free end of which is in turn pivoted to a bell crank lever 31 fulcrumed as at 32 and having its free end 33 straddling a pin 34 mounted upon one side of a piston 36. This piston travels within a cylinder 37, which cylinder is provided with a port adjacent its closed end. This port is covered by a flap valve 39 which is in turn provided with a bleeder 41, the operation of which will be later seen.

At 42, I have shown an expansion spring contacting the closed end of the cylinder 37 and having its opposite end abutting the bottom of the piston 36. This piston has in turn secured to its outer extremity a rod 43, which is adapted to pass between contacts 44 and 46. These contacts are connected by wires to suitable street lights or semaphore signals. It will thus be seen that as a vehicle moves over the surface of a street and comes into contact with the cover plates 24 and 26, the same will be depressed, which depression movement will be transmitted through the link 29, bell crank 31, pin 34 to the piston 36 which will cause the rod 43 to contact the contacts 44 and 46, thus displaying a visible or audible signal at the road crossing. During this rearward movement of the piston, the flap valve 41 will open so as to allow the rapid escape of air from within the cylinder. As soon as the air has escaped, the valve 41 will close and as the spring 42 tries to expand, a vacuum is established within the cylinder. This vacuum prevents the cylinder from moving outwardly at a rapid speed thereby holding the electrical circuit for a considerable length of time, or until a vehicle would have normally passed the crossing. The bleeder 41 will gradually allow the air to enter the piston 36 so as to overcome the vacuum and allow the parts to return to their normal position thus stopping the signal.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

In a switch for a road signal, a box adapted to be mounted in a road-way, said box having a cover, said cover comprising two sections having a sliding dove-tail connection, a link pivoted to one of said sections, a bell-crank fulcrumed within said box, and having one of its arms connected to said link, a cylinder mounted within said box, a spring mounted within said cylinder, a piston movable in said cylinder against the action of said spring, said cylinder being connected to the free arm of said bell-crank, a rod secured to said cylinder, contacts mounted on said box and adapted to be electrically connected by said rod, and a valve positioned on said cylinder, said valve being capable of permitting rapid exhaust of air from said cylinder, and a slow ingress of air to said cylinder, substantially as and for the purpose specified.

In testimony whereof I affix my signature.

GERRIT H. DALMAN.